Figure 1:
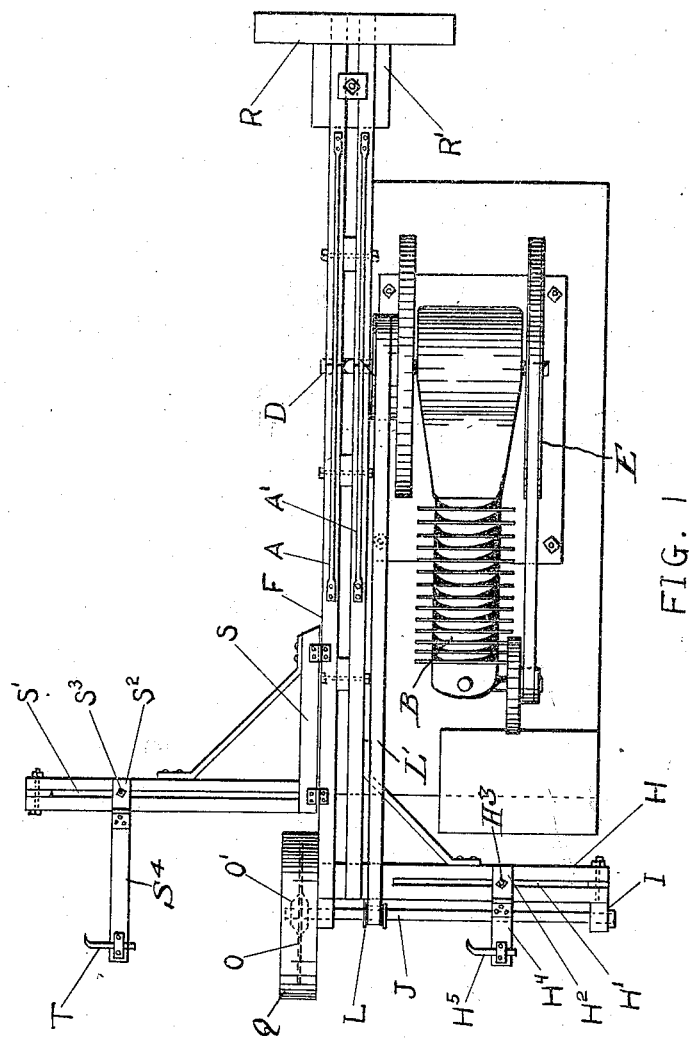

E. L. STONE.
ICE CUTTING MACHINE.
APPLICATION FILED SEPT. 30, 1918.

1,296,225.

Patented Mar. 4, 1919.
2 SHEETS—SHEET 1.

Inventor
EDGAR L. STONE
By Franklin N. Hoyt
Attorney

E. L. STONE.
ICE CUTTING MACHINE.
APPLICATION FILED SEPT. 30, 1918.
1,296,225.
Patented Mar. 4, 1919.
2 SHEETS—SHEET 2.
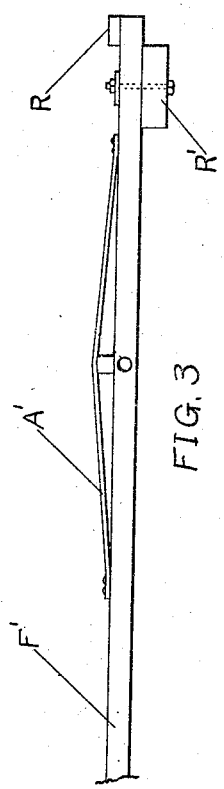
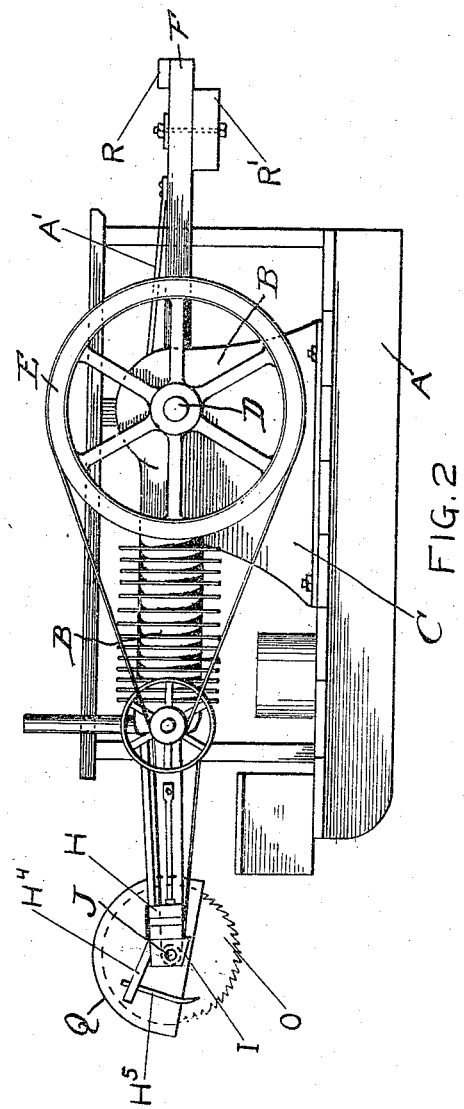
Inventor
EDGAR L. STONE
By Franklin N. Hoyt
Attorney

UNITED STATES PATENT OFFICE.

EDGAR L. STONE, OF WATERFORD, MAINE.

ICE-CUTTING MACHINE.

1,296,225.   Specification of Letters Patent.   Patented Mar. 4, 1919.

Application filed September 30, 1918. Serial No. 256,338.

*To all whom it may concern:*

Be it known that I, EDGAR L. STONE, a citizen of the United States, residing at Waterford, in the county of Oxford and State of Maine, have invented certain new and useful Improvements in Ice-Cutting Machines; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for cutting ice, and consists of a simple and efficient device of this nature having various details of construction, combination and arrangement of parts which will be hereinafter fully described shown in the accompanying drawings and then specifically defined in the appended claims.

I illustrate my invention in the accompanying drawings which, with the letters of reference marked thereon, form a part of this application and in which:

Figure 1 is a top plan view of the ice cutting machine. Fig. 2 is a side elevation. Fig. 3 is an enlarged detail view of the walking beam.

Reference now being had to the details of the drawings by letter:—

A designates a sled provided with suitable runners and upon which the operative parts of the apparatus are mounted. A suitable engine B is mounted upon said sled, and mounted upon suitable bearings on the standard C is a power shaft D, having a pulley E fixed thereto which is driven by belted connection with the motor. A walking beam F is made preferably of two pieces reinforced by suitable struts and which is pivotally mounted in bearings upon the power shaft D. Said walking beam has a laterally extending arm H at its forward end carrying the bearing members I in which the arbor J is journaled and which latter has keyed thereto a flanged pulley L which has belted connection L' with a pulley E' which is fixed to the driving shaft D.

At one end of the arbor a saw O is mounted, secured by a nut O' and a suitable guard Q is fitted over the saw and extends down a considerable distance, preferably near to the surface of the ice to be cut, and which will prevent the particles of snow and ice produced by the cutting of the saw from flying about and confining the same between the cuts in the ice leaving the grooves which have been previously marked clear of ice, so that they may be seen readily when the apparatus moves forward in the act of cutting the ice.

At the rear end of the walking beam is a handle R, and R' designates a weight secured to the under surface of said walking beam, and serves as a means for counterbalancing the weight of the arbor and saw at the opposite end. Said arm H is provided with an elongated slot H' and H² is a block having an adjusting screw H³ movable within said slot and adapted to hold the block in different adjusted positions. A plate H⁴ is hinged to said block and carries an adjustable marker H⁵ at one end thereof and which is adapted to scratch a groove in the ice to be followed by the saw when the apparatus again passes over the surface of the ice.

A swinging bracket member S is hinged to one side of the walking beam and has a longitudinal slot S' therein and S² is a block similar to the block H² before referred to, and which carries an adjusting screw S³ passing through the slot S' and serves as a means for holding the block S² in an adjusted position. A plate S⁴ is hinged to the block S² and carries an adjustable marker T which will serve as a means for forming a groove in the ice upon the opposite side of the apparatus from that made by the marker upon the other side.

In operation, it will be noted that the operator may push the sled over the surface of the ice to be cut and by tilting the walking beam, may regulate the cutting of the ice, and as the apparatus is pushed forward the surface of the ice will be grooved at such distances at which the markers may be set to designate the cuts to be made when the apparatus is again passed over the surface of the ice.

What I claim to be new is:

1. An apparatus for cutting ice, comprising a sled with a standard thereon, a tilting walking beam, a motor, a driving shaft journaled upon the standard of the sled and having belted connection with the motor, an arbor journaled in suitable bearings upon the walking beam and having belted connection with the pulley upon the driving shaft, and a saw fixed to the arbor, said walking beam having a laterally extending arm at its forward end, and an adjustable marker mounted upon said arm.

2. An apparatus for cutting ice, comprising a sled with a standard thereon, a tilting walking beam, a motor, a driving shaft journaled upon the standard of the sled and having belted connection with the motor, an arbor journaled in suitable bearings upon the walking beam and having belted connection with the pulley upon the driving shaft, and a saw fixed to the arbor, an adjustable block mounted upon the walking beam, and a marker carrying plate hinged to said block, and a marker adjustably held upon the plate.

3. An apparatus for cutting ice, comprising a sled with a standard thereon, a driving shaft journaled in suitable bearings upon the standard, a motor upon the sled having belted connection with the driving shaft, a walking beam pivotally mounted upon said shaft, a counterbalanced weight upon the rear end of the walking beam, and an arbor journaled in suitable bearings at the forward end and a handle at the rear end of the walking beam, pulleys, and belted connections between the driving shaft and arbor, a saw keyed to the latter, and an adjustable marker upon the walking beam.

4. An apparatus for cutting ice, comprising a sled with a standard thereon, a driving shaft journaled in suitable bearings upon the standard, an arbor journaled in suitable bearings at the forward end of the beam, a counterbalanced weight and a handle at the rear end, and belted connections between the arbor and driving shaft, a hinged bracket member mounted upon the walking beam, and an adjustable marker mounted upon said bracket member.

In testimony whereof I hereunto affix my signature in presence of two witnesses.

EDGAR L. STONE.

Witnesses:
  FLORENCE B. ROUNDS,
  LAURENCE R. ROUNDS.

Copies of this patent may be obtained for five cents each, by addressing the "Commissioner of Patents, Washington, D. C."